US011218915B2

(12) United States Patent
Liu et al.

(10) Patent No.: US 11,218,915 B2
(45) Date of Patent: Jan. 4, 2022

(54) SWITCHING METHOD AND DEVICE AND COMPUTER STORAGE MEDIUM

(71) Applicant: SHENZHEN HEYTAP TECHNOLOGY CORP., LTD., Shenzhen (CN)

(72) Inventors: Jianhua Liu, Guangdong (CN); Ning Yang, Guangdong (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/763,799

(22) PCT Filed: Nov. 16, 2017

(86) PCT No.: PCT/CN2017/111361
§ 371 (c)(1),
(2) Date: May 13, 2020

(87) PCT Pub. No.: WO2019/095206
PCT Pub. Date: May 23, 2019

(65) Prior Publication Data
US 2020/0389822 A1    Dec. 10, 2020

(51) Int. Cl.
*H04W 4/00* (2018.01)
*H04W 36/00* (2009.01)
(Continued)

(52) U.S. Cl.
CPC ... *H04W 36/0022* (2013.01); *H04W 36/0066* (2013.01); *H04W 36/18* (2013.01); *H04W 88/06* (2013.01); *H04W 88/10* (2013.01)

(58) Field of Classification Search
CPC ............. H04W 28/02; H04W 28/0252; H04W 28/0257; H04W 28/0263; H04W 28/085;
(Continued)

(56) References Cited

U.S. PATENT DOCUMENTS

2012/0094627 A1\* 4/2012 Suh ..................... H04W 60/04
455/404.1
2016/0262021 A1    9/2016 Lee et al.
(Continued)

FOREIGN PATENT DOCUMENTS

CN    105323867 A    2/2016
CN    105517056 A    4/2016
(Continued)

OTHER PUBLICATIONS

HUAWEI: "Inter-system mobility cases". 3GPP Draft: R3-170229 Inter-System Mobility, 3rd Generation Partnership Project (3GPP), Mobile Competence Centre 650, Route Des Lucioles : F-06921Sophia-Antipolis Cedex: France, vol. RAN WG3, no. Spokane, Washington, USA: Jan. 17, 2017-Jan. 19, 2017 Jan. 11, 2017 (Jan. 11, 2017), XP051204287, \*2.1 Inter-system inter-RAT handover \* \* figure 1 \* \* 2.2 Inter-system intra-RAT handover \*\* Figure 2 (2) CN relocation within LTE eNB connected to both CN\* \* figure 3 \*.
(Continued)

*Primary Examiner* — Matthew W Genack
(74) *Attorney, Agent, or Firm* — Perkins Coie LLP

(57) ABSTRACT

The embodiment of the present invention provides a switching method and device and a computer storage medium. The method is applied to a base station capable of supporting access to an LTE core network and a 5G core network; on the premise that the base station does not trigger switching, the method comprises: releasing a first context and a first connection configuration for user equipment (UE) with a network element of a source core network; establishing a second context and a second connection for the UE with a network element of a target core network after receiving a switching command sent from the network element of the target core network; and configuring a new radio bearer with the UE.

9 Claims, 5 Drawing Sheets

(51) Int. Cl.
*H04W 36/18* (2009.01)
*H04W 88/06* (2009.01)
*H04W 88/10* (2009.01)

(58) Field of Classification Search
CPC ......... H04W 36/0022; H04W 36/0027; H04W 36/0066; H04W 36/18; H04W 36/28
See application file for complete search history.

(56) References Cited

U.S. PATENT DOCUMENTS

| | | |
|---|---|---|
| 2017/0034749 A1 | 2/2017 | Chandramouli et al. |
| 2017/0230829 A1 | 8/2017 | Lee et al. |
| 2017/0331577 A1* | 11/2017 | Parkvall ............... H04J 11/0079 |

FOREIGN PATENT DOCUMENTS

| | | |
|---|---|---|
| CN | 106465080 A | 2/2017 |
| CN | 107018542 A | 8/2017 |

OTHER PUBLICATIONS

HUAWEI: "Discussion on inter-system intra-RAT handove". 3GPP Draft: R3-171241. 3rd Generation Partnership Project (3GPP), Mobilecompetence Centre : 650, Route Des Lucioles : F-06921 Sophia-Antipolis Cedex France vol. RAN WG3, no. Spokane, Washington, USA; Apr. 3, 2017-Apr. 7, 2017 Apr. 3, 2017 (Apr. 3, 2017), XP051245951, *2.1 Comparisons among different CN relocation (Intra-cell CN relocation) **1.1 CN relocation procedures within eLTE* * figure 1 *.
HUAWEI et al.: "Discussion on Mobility scenario for E-UTRA connected to 5GC". 3GPP Draft: R2-1705713 Discussion on Mobility Scenario for E-UTRA Connected to 5GC, 3RD Generation Partnership Project(3GPP), Mobile Competence Centre ; 650, Route Des Lucioles; F-06921 Sophia-Antip vol. RAN WG2, no. Hangzhou, China;May 15, 2017 -May 19, 2017 May 14, 2017 (May 14, 2017), XP051276016, *2 Discussion * * figure 1 * * 2.1 Mobility in Connected mode* 2.2 Mobility in Idle mode.
ERICSSON: "Inter-system and inter-RAT mobility between NR and LTE", 3GPP Draft: R2-1707230-INTER-SYSTEM and Inter-RAT Mobility Between NR and LTE, 3rd Generation Partnership Project (3GPP), Mobile Competence Centre ; 650, Route Des Lucioles : F-06921 Sophia-Antipoli, vol. RAN WG2, no. Qingdao; Jun. 27, 2017-Jun. 29, 2017 Jun. 26, 2017 (Jun. 26, 2017), XP051301720, 2 Overview ** Proposals 1, 2, 4, 7*.
OPPO: "Discussion on Intra-Cell Handover with CN Type Change", 3GPP Draft: R2-1713742 Discussion on Intra-Cell Handover With CN Type Change, 3rd Generation Partnership Project (3GPP). Mobile Competence Centre : 650, Route Des Lucioles: F-06921 Sophia-Antipolis C, vol. RAN WG2, no. Reno, USA; Nov. 27, 2017-Dec. 1, 2017 Nov. 17, 2017 (Nov. 17, 2017), XP051372400, the whole document*.
Supplementary European Search Report in the European application No. 17932275.5, dated Aug. 19, 2020.
English translation of the Written Opinion of the International Search Authority in the international application No. PCT/CN2017/111361, dated Aug. 15, 2018.
International Search Report in the international application No. PCT/CN2017/111361, dated Aug. 15, 2018.
3GPP TS 36.300 V13.2.0 (Dec. 2015), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 23.501 V1.0.0 (Jun. 2017), 3rd Generation Partnership Project; Technical Specification Group Services and System Aspects; System Architecture for the 5G System; Stage 2 (Release 15).
Office Action of the Indian application No. 202027025120, dated Jun. 26, 2021. 6 pages with English translation.

* cited by examiner

SWITCHING METHOD AND DEVICE AND COMPUTER STORAGE MEDIUM

CROSS-REFERENCE TO RELATED APPLICATIONS

The present application is a U.S. National Phase Entry of International PCT Application No. PCT/CN2017/111361 filed on Nov. 16, 2017, and entitled "SWITCHING METHOD AND DEVICE AND COMPUTER STORAGE MEDIUM", the content of which is hereby incorporated by reference in its entirety.

TECHNICAL FIELD

Embodiments of the disclosure relate to field of wireless communications, and in particular to a handover method and device and a computer storage medium.

BACKGROUND

With development of the communication technology, research on the 5th Generation (5G) mobile communication technology had been started. Wireless access in the 5G is called New Radio and abbreviated as NR. During continuous evolution of the present Long Term Evolution (LTE) system into a 5G system, an evolved Node B (eNB) base station in the LTE system may be enhanced to have an ability of accessing a 5G core network, and therefore may be called a next generation eNB (ng-eNB).

For the ng-eNB, its protocol stack can use LTE-related protocols from the physical layer to the radio link control (RLC) layer from bottom to top, whereas the packet data convergence protocol (PDCP) layer can use not only LTE-related evolved universal telecommunication radio access (E-UTRA) protocols but also 5G-related NR protocols.

As the ng-eNB supports connection to not only an LTE core network, (i.e, Evolved Packet Core (EPC) network) but also but also a 5G Core (5GC) network element, when a user equipment (UE) has accessed the ng-eNB and is performing handover, there is a possibility that the handover is merely performed between core networks. In this case, how to perform handover between core networks remains a problem to be solved.

SUMMARY

To solve the above technical problems, the embodiments of the disclosure provide a handover method and device and a computer storage medium, so that when a UE which has accessed an ng-eNB is performing handover, the handover is merely performed between core networks.

Technical solutions of the embodiments of the disclosure can be implemented as follows:

In the first aspect, the embodiments of the disclosure provide a handover method, applied to a base station supporting access to a LTE core network and a 5G core network. In a case that the base station does not trigger a handover, the method includes:

releasing a first context and a first connection configuration, for a user equipment (UE), between the base station and a source core network element;

establishing a second context and a second connection, for the UE, between the base station and a target core network element, after receiving a handover command from the target core network element;

configuring a new radio bearer between the base station and the UE.

In the second aspect, the embodiments of the disclosure provide a handover method, applied to a UE side. The method includes:

sending a handover indication to a source core network element via a non-access stratum (NAS), when determining, based on a service to be supported that a handover of core network elements is needed;

configuring a new radio bearer between the UE and a current serving base station.

In the third aspect, the embodiments of the disclosure provide a handover method, applied to network elements at a core network side. The method includes:

releasing, by a source core network element, after receiving a handover indication from a UE, or after determining, based on a preset judgment strategy, that handover of core network elements for the UE is needed, a first context and a first connection configuration, for the UE, between the source network element and a serving base station of the UE;

establishing, by a target core network element, after sending a handover command to the base station, a second context and a second connection, for the UE, between the target core network element and the base station.

In the fourth aspect, the embodiments of the disclosure provide a base station, which supports access to a LTE core network and a 5G network, and the base station includes: a first release part, a reception part, a first establishment part and a first configuration part; in a case that the base station does not trigger a handover, the first release part is configured to release a first context and a first connection configuration, for a user equipment (UE), between the base station and a source core network element;

the reception part is configured to receive a handover command from a target core network element;

the first establishment part is configured to establish a second context and a second connection, for the UE, between the base station and the target core network after the reception part receives the handover command from the target core network element;

the first configuration part is configured to configure a new radio bearer between the base station and the UE.

In the fifth aspect, the embodiments of the disclosure provide a UE, which includes a determination part, a sending part and a second configuration part;

the determination part is configured to determine, based on a service to be supported, whether a handover of core network elements is needed;

the sending part is configured to send a handover indication to a source core network element via an NAS when the determination part determines, based on the service to be supported, that a handover of the core network elements is needed to be;

the second configuration part is configured to configure a new radio bearer between the UE and a current serving base station.

In the sixth aspect, the embodiments of the disclosure provide a core network side device, which includes a second release part and a second establishment part;

the second release part is configured to, after receiving a handover indication from a UE, or after determining, based on a preset judgment strategy, that a handover of core network elements for the UE is needed, indicate that a source core network element needs to release a first context and a first connection configuration, for the UE, between the source network element and a serving base station of the UE;

the second establishment part is configured to indicate that the target core network element, after sending a handover command to the base station, needs to establish a second context and a second connection, for the UE, between the target core network element and the base station.

In the seventh aspect, the embodiments of the disclosure provide a base station, which supports access to a LTE core network and a 5G core network. The base station includes: a first network interface, a first memory and a first processor;

the first network interface is configured to receive and send signals during information transceiving with one or more other external network elements;

the first memory is configured to store a computer program executable by the first processor;

the first processor is configured to execute, when running the computer program, steps in the method according to the first aspect.

In the eighth aspect, the embodiments of the disclosure provide a UE which includes a second network interface, a second memory and a second processor;

the second network interface is configured to receive and send signals during information transceiving with one or more other external network elements;

the second memory is configured to store a computer program executable by the second processor;

the second processor is configured to execute, when running the computer program, steps in the method according to the second aspect.

In the ninth aspect, the embodiments of the disclosure provide a core network side device which includes a third network interface, a third memory and a third processor;

the third network interface is configured to receive and send signals during information transceiving with one or more other external network elements;

the third memory is configured to store a computer program executable by the third processor;

the second processor is configured to execute, when running the computer program, steps in the method according to the third aspect.

In the tenth aspect, the embodiments of the disclosure provide a computer storage medium which stores a program for the handover; the program for handover, when executed by at least one processor, implements steps in the method according to any one of the first aspect, the second aspect or the third aspect.

According to the handover method and device and the computer storage medium provided in the embodiments of the disclosure, as the base stations can access both the LTE core network and the 5G network, the base station supports both the E-UTRA protocol and the NR protocol. As a result, when handover is being performed, the serving cell which the base station provides for the UE is not changed, while at the base station side, a connection between the base station and the core network element is released and re-established, thus eliminating the need to disconnect and re-establish the wireless link at the physical layer between the UE and the base station. Therefore, handover can be performed only between the core networks, and the handover performance is optimized.

DETAILED DESCRIPTION

The implementation of the embodiments of the disclosure will be described below in full detail in combination with the drawings in order to make the features and technical contents of the embodiments of the disclosure understood more clearly. The drawings are only used for reference instead of being used to limit the embodiments of the disclosure.

It is to be noted that, the following two situations may occur in the handover process in the framework environment of the LTE system: firstly, handover without changing an access type and a core network type, such as an Intra-LTE handover; secondly, a handover in which both the type of access and the type of the core network are changed. For example, when a core network is switched from an EPC network to a core network of a universal mobile telecommunication system (UMTS), the access type will change accordingly.

Figure 1:
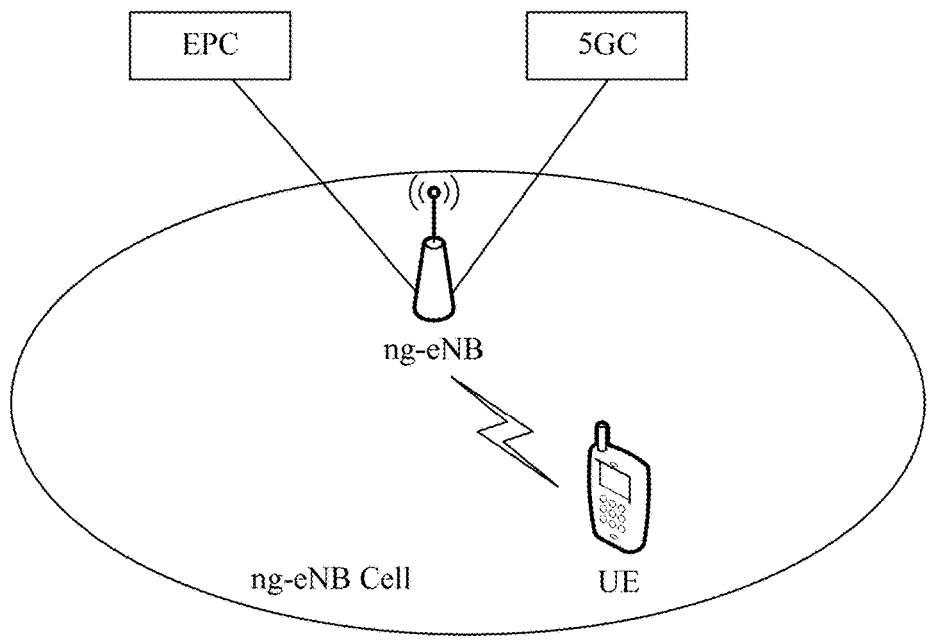
FIG. 1 illustrates a schematic flowchart of an exemplary scenario framework according to the embodiments of the disclosure.

However, because ng-eNB base stations supports both EPC networks and 5GC networks, after a UE accesses an ng-eNB, the technical solutions of the embodiments of the disclosure can be exemplarily applied to the scenario framework illustrated in FIG. 1. As illustrated in FIG. 1, a UE is located in a cell (ng-eNB Cell) covered by a ng-eNB, while the ng-eNB can be connected to both an EPC and a 5GC. In more detail, the ng-eNB can be connected to an access and mobility management function (AMF) in the 5GC.

Figure 2:
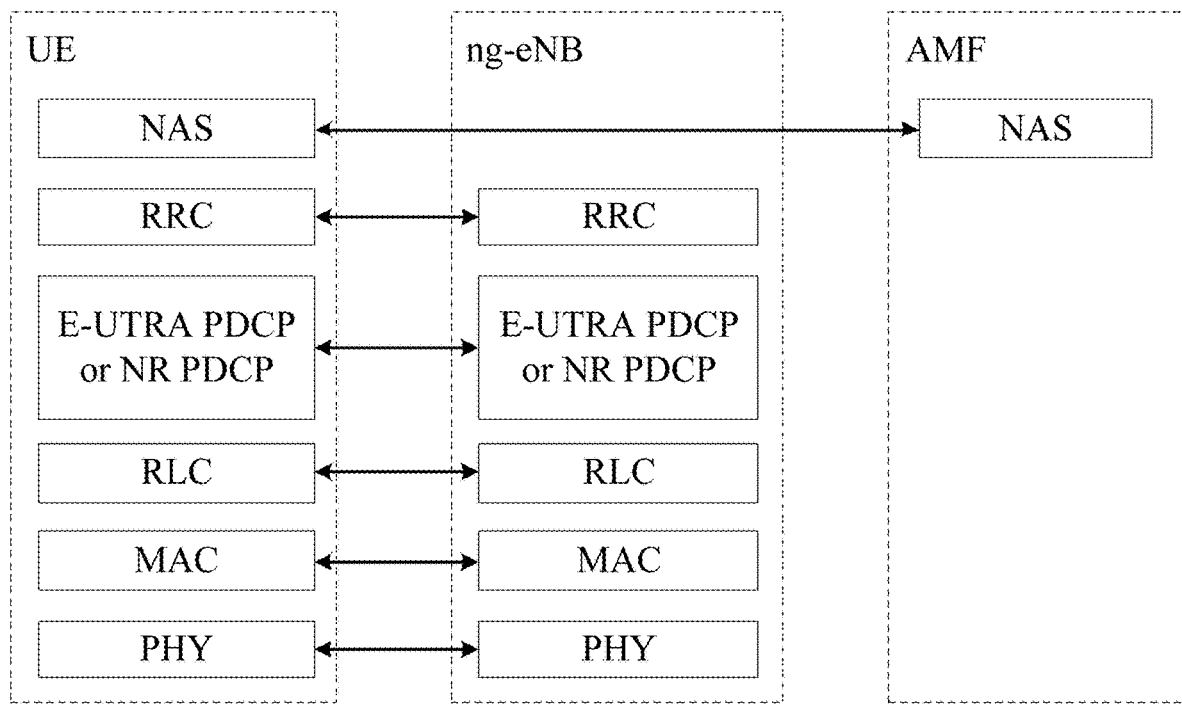
FIG. 2 illustrates a schematic diagram of a protocol layer framework according to the embodiments of the disclosure.

As illustrated in a schematic diagram of protocol layer framework in FIG. 2, in terms of a protocol layer, a protocol stack of the ng-eNB can use LTE-related protocols from the physical layer to the media access control (MAC) layer and even to the RLC layer, while the PDCP layer can use LTE-related E-UTRA protocols and 5G-related NR protocols.

Different from framework environments of the LTE system, in the framework as illustrated in FIG. 1, the ng-eNB which the UE accesses is not changed during the handover. In other words, the access type is not changed during the handover. For example, the core network is switched from an EPC to a 5GC or from a to an EPC. As a result, in the technical solutions of the disclosure, the following embodiments are proposed based on the above.

Embodiment One

Figure 3:
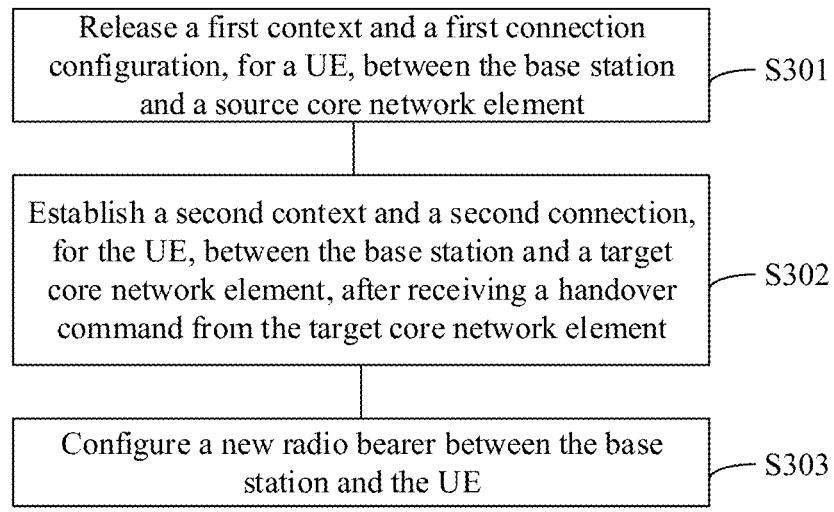
FIG. 3 illustrates a schematic flowchart of a handover method according to the embodiments of the disclosure.

FIG. 3 illustrates a process of a handover method provided by this embodiment of the disclosure. The method can be applied to a base station that can access both a LTE core network element and a 5G core network element. In the case that the base station does not trigger a handover, the method can include the following actions.

In S301, a first context and a first connection configuration, for a UE, between the base station and a source core network element are released.

In S302, a second context and a second connection, for the UE, between the base station and a target core network element are established, after receiving a handover command from the target core network element.

Specifically, when the source core network element is an EPC network element, the target core network element is a 5GC network element, the first connection configuration comprises a control plane configuration and a user plane configuration of an S1 interface related to the UE, and the second connection configuration is a configuration of a connection between an N2 interface and an N3 interface related to the UE.

When the source network element is a 5GC network element, the target core network element is an EPC network element, the first connection configuration comprises a connection configuration of the N2 interface and a connection configuration of the N3 interface related to the UE, and the second connection configuration is a configuration of the control plane and the user plane of the S1 interface related to the UE;

In S303, a new radio bearer between the base station and the UE is configured. It is to be noted that, in the process of the handover method at the base station side illustrated in FIG. 3, switching of core networks is triggered by either the UE based on a service to be supported or at a core network side based on loads or subscription information of the user. Therefore, the handover process is not triggered by a measurement report, and the base station does not know an event that a handover is needed before the core network element does. An execution order of steps in the technical solution illustrated in FIG. 3 is not defined. For example, if the UE supports multi-access channels, S302 can be executed before S301; if the UE only supports a single-access channel, S301 is needed to be executed before S302.

As can be seen from the technical solution illustrated in FIG. 3, since the base station can access both the LTE core network and the 5G core network, the base station supports both E-UTRA protocols and NR protocols. As a result, when the handover is being performed, a serving cell which the base station provides for the UE does not change, and thus, the base station may merely release and reestablish connections between the base station and the core network elements, without disconnecting and re-establishing wireless links between the UE and the base station at the physical layer. Through the technical solution illustrated in FIG. 3, the handover can be performed merely between the core networks during the handover process, and optimizes the handover performance is optimized.

According to the technical solutions illustrated in FIG. 3, in a possible implementation method, the action of configuring a new radio bearer between the base station and the UE includes configuring a new signaling radio bearer (SRB) and a new data radio bearer (DRB) between the base station and the UE.

It can be understood that because the type of the core network element before the handover is different from the type of the core network element after the handover, the base station needs to reconfigure the PDCP layer between the base station and the UE, particularly the SRB and the DRB; more particularly, what is to be reconfigured may include a new PDCP version and a security key.

For the technical solution illustrated in FIG. 3, after performing the handover of the core networks, the base station has to determine whether the re-establishment of other protocol layers between the base station and the UE is needed, and as a result, in a possible implementation method, the technical solution illustrated in FIG. 3 may further include the following actions: determining, based on a preset first strategy, whether re-establishment of a RLC layer between the base station and the UE is needed; when determining that the re-establishment is needed, reconfiguring the RLC layer between the base station and the UE; otherwise, not reconfiguring the RLC layer between the base station and the UE.

Specifically, the action of determining, based on the preset first strategy, whether re-establishment of the RLC layer between the base station and the UE is needed, may include the following actions: acquiring configuration information of the RLC layer needed by a new radio bearer; comparing the configuration information of the RLC layer needed by the new radio bearer with configuration information of the RLC layer needed by a previous radio bearer; when the configuration information of the RLC layer needed by the new radio bearer and the configuration information of the RLC layer needed by the previous radio bearer are consistent with each other, determining that re-establishment of the RLC layer between the base station and the UE is not needed; otherwise, determining that re-establishment of the RLC layer between the base station and the UE is needed.

In addition, the base station also needs to determine whether restart of the MAC layer between the base station and the UE is needed. As a result, in a possible implementation method, the technical solutions illustrated in FIG. 3 may further include the following actions: determining, based on a preset second strategy, whether restart of the MAC layer between the base station and the UE is needed; when determining that the restart of the MAC layer is needed, reconfiguring the MAC layer between the UE and the base station; otherwise, not reconfiguring the MAC layer between the UE and the base station.

Specifically, the action of determining, based on the preset first strategy, whether restart of the MAC layer between the base station and the UE is needed, may include the following actions: acquiring configuration information of the MAC layer needed by a new radio bearer; comparing the configuration information of the MAC layer needed by the new radio bearer with configuration information of the MAC layer needed by a previous radio bearer; when the configuration information of the MAC layer needed by the new radio bearer and the configuration information of the MAC layer needed by the previous radio bearer are consistent with each other, determining that restart of the MAC layer between the base station and the UE is not needed; otherwise, determining that restart of the MAC layer between the base station and the UE is needed.

Through the above two implementations, it can be known that in addition to the radio bearer, the RLC layer and the MAC layer between the base station and the UE may be re-established as needed, and there is no need to re-establish the physical layer, hence optimizing the performance in the handover of the core networks.

Embodiment Two

Figure 4:
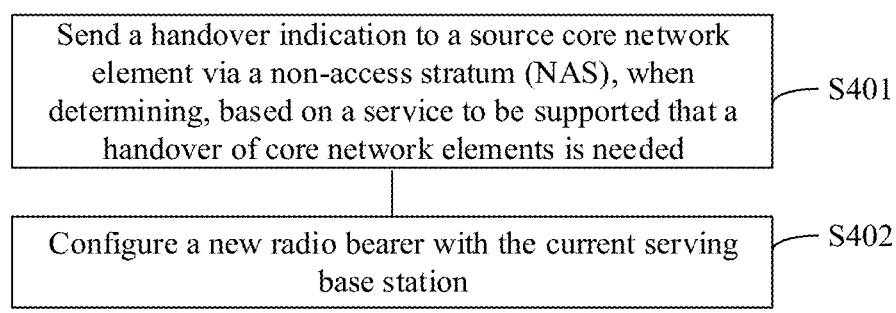
FIG. 4 illustrates a schematic flowchart of another handover method according to the embodiments of the disclosure.

Based on an inventive concept as same as the first embodiment of the disclosure, a process of a handover method provided by this embodiment of the disclosure is provided as illustrated in FIG. 4, and may be applied at a UE side. The process may include the following actions.

In S401, a handover indication is sent to a source core network element via a NAS, when determining, based on a service to be supported that a handover of core network elements is needed.

It should be noted that the handover indication can be carried in the NAS, indicating to a source network element that a handover of types of core network elements is needed. Then, a current serving base station releases a context and related connection configuration of a UE between the base station and a source core network element, and establishes the context and related connection configuration of the UE between the base station and a target core network element. S301 and S302 in the first embodiment of the disclosure may be referred to for the detailed process, which will not be elaborated here to avoid repetition. After the handover between the core network element and the current serving base station is completed, re-establishment of a radio bearer between the UE and the current serving base station is needed. As a result, the solution illustrated in FIG. 4 may further include the following actions.

In S402, a new radio bearer between the UE and the current serving base station is configured.

It can be understood that because the type of core network element after the handover is different from the type of the core network element before the handover, a reconfiguration of the radio bearer between the UE and the current serving base station is needed. In other words, a configuration of an PDCP layer between the UE and the current serving base station, particularly a configuration of an SRB and a DRB, is needed. Specifically, the configuration may include a configuration of a new PDCP version, a new security key, and etc.

It should be noted that during the handover process, the UE maintains a physical-layer radio link connection with the current serving base station, and therefore the whole handover process does not need a random access channel (RACH) process, and the UE can maintain uplink synchronization.

In a possible implementation of the technical solution illustrated in FIG. 4, the action of determining, based on the service to be supported, whether the handover of core network elements is needed may include: determining, based on the core network type needed by the service to be supported, that the handover of core network elements is needed when the needed core network type and a core network type the UE accesses are inconsistent with each other. For example, services supported by an EPC network may be different from services supported by a 5GC network element. For another example, evolved multimedia broadcast/multicast services (eMBMS) and vehicle to everything (V2X), which are supported by the EPC network, are not supported by the 5GC network element. As a result, the UE may choose a suitable core network element based on needed service(s).

Or, the action of determining, based on the service to be supported, whether the handover of core network elements is needed may include: determining, based on acquired external influencing information, that the handover of the core network elements is needed. For example, when a service A is supported by both the EPC network element and the 5GC network element, then it may be determined, based on a usage preference that a user sets on the UE or a statistic result of most users' preferences on the core network type that the service A is adapted to, that the core network type needs to be changed to support the service.

With regard to the technical solution illustrated in FIG. 4, after the handover of the core networks, the current serving base station further needs to determine whether re-establishment of other protocol layers between the base station and the UE is needed. As a result, in a possible implementation method, the technical solution illustrated in FIG. 5 may further include: re-establishing, based on a first strategy of the current serving base station, an RLC layer between the base station; and/or restarting, based on a second strategy of the current serving base station, an MAC layer between the base station and the UE.

Specifically, the first strategy is comparing, by the current serving base station, configuration information of an RLC layer needed by a new radio bearer with configuration information of an RLC layer needed by a previous radio bearer; when the configuration information of the RLC layer needed by the radio bearer with the configuration information of the RLC layer needed by the previous radio bearer are consistent with each other, determining that re-establishment of the RLC layer is not needed; otherwise, determining that re-establishment of the RLC layer is needed.

The second strategy is comparing, by the current serving base station, configuration information of an MAC layer needed by the new radio bearer with configuration information of an MAC layer needed by the previous radio bearer; when the configuration information of the MAC layer needed by the new radio bearer with the configuration information of the MAC layer needed by the previous radio bearer are consistent with each other, determining that restart of the MAC layer is not needed; otherwise, determining that restart of the MAC layer is needed.

With regard to the technical solution illustrated in FIG. 4, as the handover is performed merely between the core networks, and there is need to re-establish the physical-layer wireless links between the UE and the current serving base station, performance of the handover is hence optimized.

Embodiment Three

Figure 5:
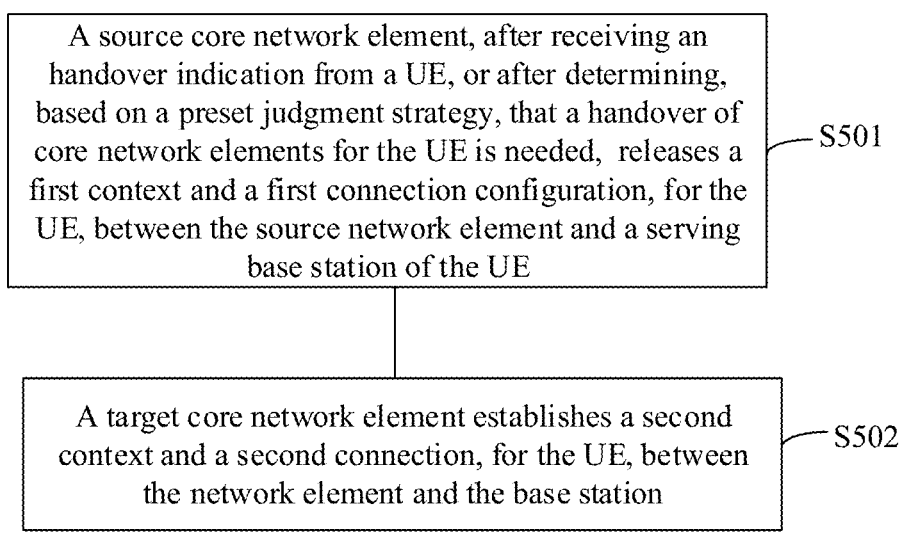
FIG. 5 illustrates a schematic flowchart of another handover method according to the embodiments of the disclosure.

Based on an inventive concept as same as the previous embodiments of the disclosure, a process of a handover method is provided in the embodiment of the disclosure as illustrated in FIG. 5, which can be applied to a network element at a core network side. The process includes the following actions.

In S501, a source core network element, after receiving an handover indication from a UE, or after determining, based on a preset judgment strategy, that a handover of core network elements for the UE is needed, releases a first context and a first connection configuration, for the UE, between the source network element and a serving base station of the UE;

In S502, a target core network element establishes a second context and a second connection, for the UE, between the network element and the base station. It should be noted that, in the embodiment of the disclosure, the network elements at the core network side may include a source network element and a target core network element, and the two elements are of different core network types. Specifically, when the source network element is an evolved packet core (EPC) network element, the target core network element is a 5G Core (5GC) network element, the first connection configuration includes a control plane configuration and a user plane configuration of an S1 interface related to the UE, and the second connection includes a connection of an N2 interface and a connection of an N3 interface related to the UE.

Or, when source core network element is a 5GC network element, the target core network element is an EPC network element, the first connection configuration includes a connection configuration of the N2 interface and a connection configuration of the N3 interface related to the UE, and the second connection includes a control plane connection and a user plane connection of the S1 interface related to the UE.

It is to be noted that, the execution sequence of the two actions, i.e., the source core network element releases the first context and the first connection configuration, for the UE, between the source core network element and the serving base station of the UE, and the target core network element sends a handover command to the base station before establishing the second context and the second connection, for the UE, between the target core network element and the base station, is not limited. For example, when the UE supports multi-access channels, the target core network element may establish the second context and second connection, for the UE, between the target core network element and the UE after sending the handover command to the base station, and then the source core network element may release the first context and the first connection configuration, for the UE, between the source core network element and the UE. When the UE merely supports a single access channel, the source core network element needs to release the first context and the first connection configuration, for the UE, between the serving base station of the UE and the source core network element, and then the target core network element may send the handover command to the base station and then establish the second context and the second connection, for the UE, between the target core network element and the base station.

In a possible implementation of the technical solution illustrated in FIG. 5, the handover indication is carried in an NAS signaling sent by the UE and indicates to the source core network element that a handover of core network element types is needed.

However, in another possible implementation, the action of determines that the handover of the core network elements is needed, based on a preset judgment strategy includes: determining whether the handover of the core network elements for the UE terminal is needed, based on at least one of: a load condition, subscription information of a user, or a defined triggering reason, for example performing a handover from an EPC network element to a 5GC network element or from the 5GC network element to the EPC network element.

For example, when a current load of the source core network element is larger than a preset load threshold, or the source core network element type is different from the core network element type indicated by subscription information of a user, or other preset triggering conditions are met, the handover of the core network elements of the UE needs to be triggered. However, it should be noted that the serving base station which provides a serving cell to the UE is not changed.

Specifically, in the embodiment of the disclosure, when the core network element is an EPC network element, the specific network element entity may be a mobility management entity (MME) in the EPC network element; when the core network element is a 5GC network element, the specific network element may be an AMF in the 5GC.

Embodiment Four

Figure 6:
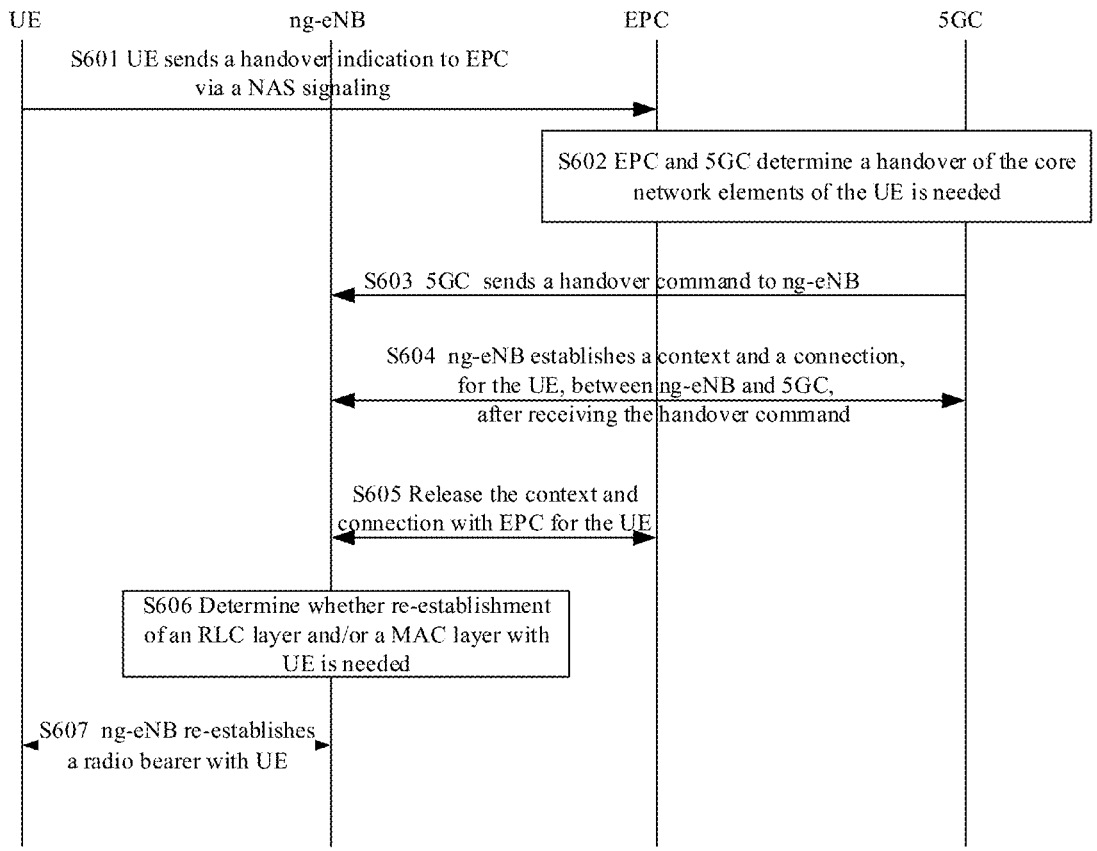
FIG. 6 illustrates a schematic flowchart of a detailed example of a handover method according to the embodiments of the disclosure.

Based on an inventive concept as same as the previous embodiments of the disclosure, in this embodiment of the disclosure, the technical solution of the previous embodiments of the disclosure is described with a detailed example in conjunction with the framework illustrated in FIG. 1. In the detailed example, an EPC network element is a source core network element, a 5GC network element is a target core network element, and a current serving base station of a UE is a ng-eNB. A detailed process of a handover method illustrated in FIG. 6 includes the following actions.

In S601, the UE sends a handover indication to the EPC network element via a NAS signaling.

In S602, the EPC network element and the 5GC network element determine that a handover of the core network elements of the UE is needed;

It should be noted that each of the above two steps illustrates triggering conditions of the handover. Tt can be understood that, in the embodiment of the disclosure, the handover is not triggered by the ng-eNB, and thus the ng-eNB will not be triggered before the core network elements know the handover. After the handover is triggered, the process also includes:

In S603, the 5GC network element sends a handover command to the ng-eNB.

In S604, the ng-eNB establishes a context and a connection, for the UE, between the ng-eNB and the 5GC network element.

It should be noted that because the 5GC network element is the target core network element, the UE-related context and UE-related connections, of an N2 interface and an N3 interface, are established between the ng-eNB and the 5GC network element.

In S605, the ng-eNB releases the context and the connection between the ng-eNB and the EPC network element for the UE.

It should be noted that, because the EPC network element is the source core network element, the UE-related context between the ng-eNB and the EPC network element, and UE-related control plane configuration and user plane configuration of an S1 interface need to be released.

It can be understood that, S603 and S604 describe a process in which the ng-eNB establishes a connection with the target core network element, and S605 describes a process in which the ng-eNB releases a connection with the source core network element. The above 2 processes can be executed in any sequence. For example, if the UE supports multi access channels, the ng-eNB can establish the connection with the target core network element before releasing the connection with source core network element; if the UE merely supports a single access channel, the ng-eNB needs to release the connection with the source core network element before establishing the connection with the target core network element. The embodiment of the disclosure does not restrict the execution sequence.

In S606, the ng-eNB determines whether re-establishment of an RLC layer and/or a MAC layer between the ng-eNB and the UE is needed.

It should be noted that the ng-eNB needs to determine whether protocol layer(s) (which may be the RLC layer and/or the MAC layer) other than the PDCP layer between the UE and the ng-eNB need(s) to be re-established or started.

For the RLC layer, the ng-eNB may determine, based on a preset first strategy, whether re-establishment of the RLC layer between the ng-eNB and the UE is needed.

If the re-establishment of the RLC layer between the ng-eNB and the UE is needed, the RLC layer between the ng-eNB and the UE will be reconfigured; otherwise, the RLC layer between the ng-eNB and the UE will not be reconfigured Specifically, the action of determining, based on the preset first strategy, whether re-establishment of the RLC layer between the UE and the ng-eNB is needed may include: acquiring configuration information of the RLC layer needed by a new radio bearer; comparing the configuration information of the RLC layer needed by the new radio bearer with configuration information of the RLC layer needed by a previous radio bearer; when the configuration information of the RLC layer needed by the new radio bearer and the configuration information of the RLC layer needed by the previous radio bearer are consistent with each other, determining that re-establishment of the RLC layer between the base station and the UE is not needed; otherwise determining that re-establishment of the RLC layer between the base station and the UE is needed.

The ng-eNB may determine, based on a preset second strategy, whether restart of a MAC layer between the ng-eNB and the UE is needed; when the restart of the MAC layer between the ng-eNB and the UE is needed, the MAC layer between the ng-eNB and the UE will be reconfigured; otherwise, the MAC layer between the ng-eNB and the UE will not be reconfigured.

Specifically, the action of determining, based on the preset first strategy, whether restart of the MAC layer between the UE and the ng-eNB is needed includes: acquiring configuration information of the MAC layer needed by a new radio bearer; comparing the configuration information of the MAC layer needed by the new radio bearer with configuration information of the MAC layer of a previous radio bearer; when the configuration information of the MAC layer needed by the new radio bearer and the configuration information of the MAC layer of the previous radio bearer are consistent with each other, determining that the restart of the MAC layer between the ng-eNB and the UE is not needed; otherwise determining that the restart of the MAC layer between the ng-eNB and the UE is needed.

In S607, the ng-eNB re-establishes the radio bearer between the UE and the ng-eNB.

Specifically, the step can include configuration of a new SRB and a new DRB between the ng-eNB and the UE. It can be understood that, since the core network element type before the handover is different from the core network type after the handover, the base station needs to reconfigure the PDCP layer between the base station and the UE, particularly, the base station needs to reconfigure the SRB and DRB, and more particularly, the base station needs to reconfigure a new PDCP version, a new security key, and so on.

It can be seen from the above processes that besides the radio bearer between the ng-eNB and the UE, the RLC layer and the MAC layer between the ng-eNB and the UE may have to be re-established or started if needed, while re-establishment of a physical layer is not needed, and hence performance of the handover between the core networks is further optimized.

Embodiment Five

Figure 7:
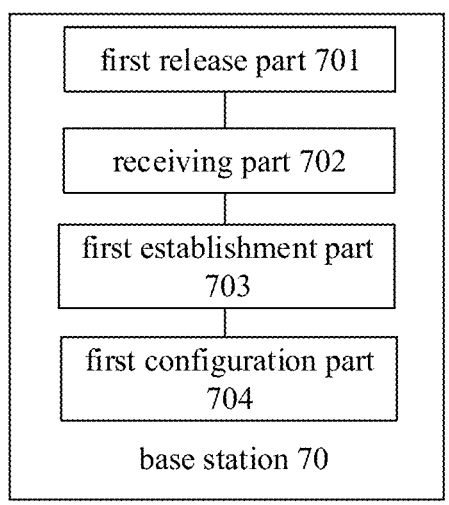
FIG. 7 illustrates a block diagram of a base station according to the embodiments of the disclosure.

Based on an inventive concept as same as the previous embodiments of the disclosure, a base station 70 is provided in the embodiment of the disclosure as illustrated in FIG. 7. The base station supports access to both an LTE core network and a 5G core network, and includes a first release part 701, a reception part 701, a first establishment 703 and a first configuration part 704.

In a case that the base station does not trigger a handover, the first release part 701 is configured to release a first context and a first connection configuration, for a user equipment (UE), between the base station and a source core network element; the reception part 702 is configured to receive a handover command from a target core network element; the first establishment part 703 is configured to establish a second context and a second connection, for the UE, between the base station and the target core network after the reception part 702 receives the handover command from the target core network element; the first configuration part 704 is configured to configure a new radio bearer between the base station and the UE.

In the above solution, when the source core network element is an EPC network element, the target core network element is a 5GC network element, the first connection configuration includes a control plane configuration and a user plane configuration of an S1 interface related to the UE, and the second connection includes a connection of an N2 interface and a connection of an N3 interface related to the UE; when the source network element is a 5GC network element, the target core network element is an EPC network element, the first connection configuration includes a connection configuration of the N2 interface and a connection configuration of the N3 interface related to the UE and the second connection is a connection between of the control plane and the user plane of the S1 interface related to the UE.

In the above solution, the first configuration part 704 may specifically be configured to configure a new SRB and a new DRB between the base station and the UE.

In the above solution, the first configuration part 704 may specifically be configured to configure a new PDCP version and a new security key.

In the above solution, the first configuration part 704 may further be configured to: determine, based on a preset first strategy, whether re-establishment of a RLC layer between the base station and the UE is needed; and reconfigure the RLC layer between the base station and the UE, when determining that re-establishment is needed, otherwise, not reconfigure the RLC layer between the base station and the UE.

In the above solution, the first configuration part 704 may specifically be configured to: acquire configuration information of the RLC layer needed by a new radio bearer; compare the configuration information of the RLC layer needed by the new radio bearer with configuration information of the RLC layer needed by a previous radio bearer; and determine that re-establishment of the RLC layer between the base station and the UE is not needed, when the configuration information of the RLC layer needed by the new radio bearer and the configuration information of the RLC layer needed by the previous radio bearer are consistent with each other; otherwise, determine that re-establishment of the RLC layer between the base station and the UE is needed.

In the above solution, the first configuration part 704 may further be configured to: determine, based on a preset second strategy, whether restart of a MAC layer between the base station and the UE is needed; and reconfigure the MAC layer between the base station and the UE, when determining that restart is needed, otherwise, not reconfigure the MAC layer between the base station and the UE.

In the above solution, the first configuration part 704 is specifically configured to: acquire configuration information of the MAC layer needed by the new radio bearer; compare the configuration information of the MAC layer needed by the new radio bearer with the configuration information of the MAC layer needed by a previous radio bearer; and determine that restart of the MAC layer between the base station and the UE is not needed, when the configuration information of the MAC layer needed by the new radio bearer and the configuration information of the MAC layer needed by the previous radio bearer are consistent with each other; otherwise, determine that restart of the MAC layer between the base station and the UE is needed.

It can be understood in this embodiment of the disclosure, the "part" may be a part of an electric circuit, a part of a processor, a part of a program or software, or the like. Of course, the "part" may also be a unit. The "part" may be modular or non-modular.

In addition, each of the components of the embodiment of the disclosure may be integrated into a processing unit, each of the components may be an individual physical unit, or two or more components can be integrated into one unit. The above integrated unit can be implemented as hardware or a software function module.

When the integrated unit is implemented as a software function module instead of being sold or used as an individual product, it can be stored in a computer readable storage medium; based on such an understanding, in essence a part of the technical solution of the embodiment of the disclosure which makes contribution to current technologies or the whole or a part of the technical solution can be reflected in a form of a software product; the software product is stored in a storage medium and includes several instructions which can cause a computer device (a personal computer, a server or a network device) or a processor to execute all or a part of the steps in the method of the embodiment of the disclosure. The storage medium may be a medium of any type which can store program codes, such as a U flash disk, a mobile hard disk, a read only memory (ROM), a random access memory (RAM), a diskette, a compact disk (CD).

Accordingly, the embodiment of the disclosure provides a computer storage medium which stores a handover program, which, when executed at least one processor, implements the steps of the method in the first embodiment.

Figure 8:
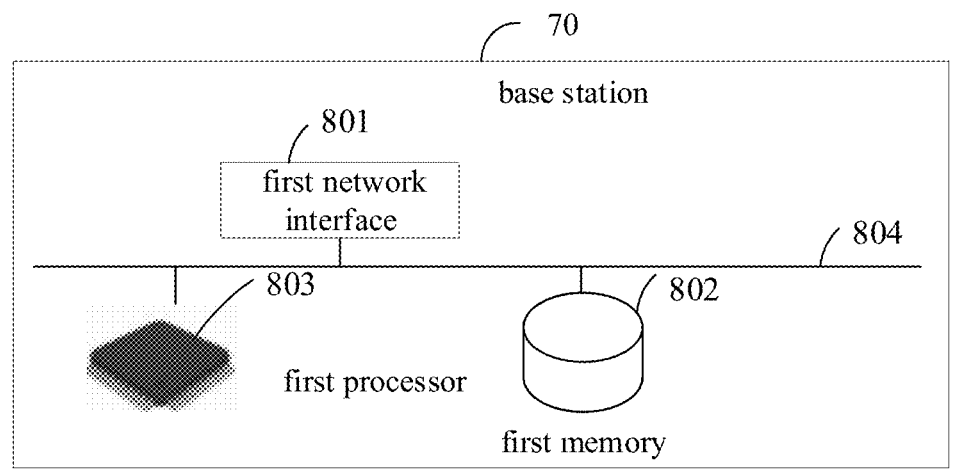
FIG. 8 illustrates a schematic diagram of the hardware structure of the base station according to the embodiments of the disclosure.

Based on the above base station 70 and the computer storage medium, a specific hardware structure of the base station 70 is provided in the embodiment of the disclosure as illustrated in FIG. 8. The base station 70 includes a first network interface 801, a first memory 802 and a first processor 803. All the components are coupled together by a bus system 804. It can be understood that the bus system 804 is configured to implement connection and communication between the components. Besides the data bus, the bus system 804 further includes a power bus, a control bus and a state signal bus. However, all the buses are designated as the bus system 804 in FIG. 8 for the purpose of clear illustration. The first network interface 801 is configured to receive and send signals during information transceiving with one or more other external network elements.

The first memory 802 is configured to store a computer program executable by the first processor 803.

The first processor is configured to: when running the computer program, release the first context and the first connection configuration, for the UE, between the source core network element and the computer storage medium; establish the second context and second connection, for the UE, between the computer storage medium and the target core network element after receiving the handover command from the target core network element; configure a new radio bearer between the base station and the UE.

It can be understood that the first memory 802 in the embodiment of the disclosure may be a volatile memory or a non-volatile memory, or may include both the volatile memory and the non-volatile memory. The non-volatile memory may be a ROM, a programmable ROM (PROM), an erasable PROM (EPROM), an electrically EPROM (EEPROM) or a flash memory. The volatile memory may be a RAM used as an external high-speed cache. As an exemplary rather than restrictive description, many types of ROM can be used, such as static RAMs (SRAM), dynamic RAMs (DRAM), synchronous DRAMs (SDRAM), double data rate SDRAMs (DDRSDRAM), enhanced SDRAMs (ESDRAM), synchlink DRAMs (SLDRAM) and direct rambus RAMs (DRRAM). The first memory 802 in the system and method described here includes but is not limited to any of the above-mentioned memories and memories of other types.

The first processor 803 may be an integrated electric circuit chip which has the ability of signal processing. In implementation, all steps of the above methods may be executed in a form of a hardware integrated logical circuit or software instructions in the first processor 803. The above first processor 803 may be a general-purpose processor, a digital signal processor (DSP), an application specific integrated circuit (ASIC), a field programmable gate array (FGPA), a programmable logical device of other type, a discrete gate, a transistor logical device, or a discrete hardware component. The first processor 803 may implement or execute each public method, step or logical block diagram in the embodiment of the disclosure. The general-purpose processor may be a micro-processor, or the processor may be any conventional processor or the like. The steps of the methods in the embodiment of the disclosure may be directly executed by hardware modules and software modules of the decoding processor or a combination of the hardware and software in the decoding processor. The software modules may be located at a storage medium well known in the art, such as a RAM, a flash disk, a ROM, a PROM, an EEPROM, a memory or a register. The storage medium is located in the first memory 802 and the first processor 803 reads information in the first memory 802 and executes the steps of the above methods with the hardware.

It can be understood that the embodiments of the disclosure may be implemented by any one or a combination of hardware, software, firmware, middleware, microcodes. With regard to implementation by hardware, a processing unit may be implemented any one or a combination of an ASIC, a DSP, a DSP device (DSPD), a programmable logic device (PLD), a FPGA, a general-purpose processor, a controller, a micro-controller, a micro-processor, and other electronic units configured to implement functions of the embodiments of the disclosure.

With regard to the implementation by software, the technologies in the embodiments of the disclosure may be implemented through executing the modules (such as processes, functions and so on) of the functions in the embodiments of the disclosure. Software codes may be stored in the memory and executed by the processor. The memory may be implemented in or outside the processor.

Specifically speaking, the first processor 803 in the base station 70 may further be configured to execute, when running the computer program, the steps of the methods in the first embodiment of the disclosure, which will not be repeated here.

Embodiment Six

Figure 9:
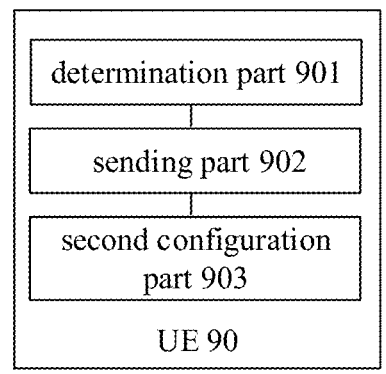
FIG. 9 illustrates a block diagram of a UE according to the embodiments of the disclosure.

Based on an inventive concept as same as the previous embodiments of the disclosure, a composition of a UE 90 is provided by the embodiment of the disclosure as illustrated in FIG. 9. The UE 90 includes a determination part 901, a sending part 902 and a second configuration part 903.

The determination part 901 is configured to determine, based on a service to be supported, whether a handover of core network elements is needed.

The sending part 902 is configured to send a handover indication to a source core network element via a NAS, when the determination part 901 determines, based on the service to be supported, that a handover of the core network elements is.

The second configuration part is configured to configure a new radio bearer between the UE and a current serving base station.

In the above solution, the second configuration part 903 may specifically be configured to reconfigure an SRB and a DRB between the UE and a current serving base station.

In the above solution, the second configuration part 903 may specifically be configured to configure a new PDCP version and a new security key.

In the above solution, the first determination part 901 may specifically be configured to determine a type of a core network needed by the service to be supported, and perform the handover of the core network elements, when the needed type of the core network is inconsistent with a type of a currently connected core network.

Or, the first determination part 901 may specifically be configured to determine, based on acquired information of external influence, whether the handover of the core network elements is needed.

In the above solution, the UE 90 may further include a re-establishment part 904 configured to re-establish an RLC layer between the UE and a base station based on a first strategy of the current serving base station, and/or restart a media access control MAC layer between the UE and the base station based on a second strategy of the current serving base station In addition, the embodiment of the disclosure provides a computer storage medium which stores a handover program, and the program, when executed by at least one processor, implements the steps of the method in the second embodiment. For detailed description of the computer storage medium, the fifth embodiment of the disclosure can be may be referred to, which will not be repeated here.

Figure 10:
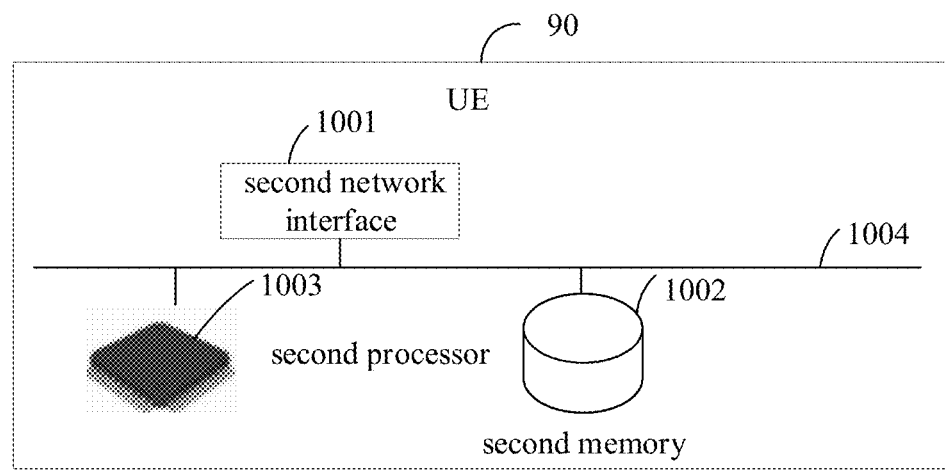
FIG. 10 illustrates a schematic diagram of the hardware structure of the UE according to the embodiments of the disclosure.

Based on the above UE 90 and the computer storage medium, a specific hardware structure of a UE 90 is provided by the embodiment of the disclosure as illustrated in FIG. 10. the UE 90 includes a second network interface 1001, a second memory 1002, and a second processor 1003. All the components are coupled together by a bus system 1004. It can be understood that the bus system 1004 is configured to implement connection and communication between the components. Besides a data bus, the bus system 1004 further includes a power bus, a control bus and a state signal bus. However, all the buses are designated as the bus system 1004 in FIG. 10 for the purpose of clear illustration. The second network interface 1001 is configured to receive and send signals during information transceiving with one or more other external network elements.

The second network interface 1001 is configured to receive and send signals during information transceiving with one or more other external network elements.

The second memory 1002 is configured to store a computer program executable by the second processor 1003.

The second processor is configured to, when running the computer program, send a handover indication to a source core network element via a NAS, when determining, based on a service to be supported, that a handover of the core network elements is needed; and configure a new radio bearer between the UE and the current serving base station.

It can be understood that components of a hardware structure of the UE 90 are similar to the corresponding parts in the fifth embodiment of the disclosure, which will not be repeated here.

Specifically speaking, the second processor 1003 in the UE 90 is also configured to execute the steps of the method in the second embodiment of the disclosure when running the computer, which will not be repeated here.

Embodiment Seven

Figure 11:
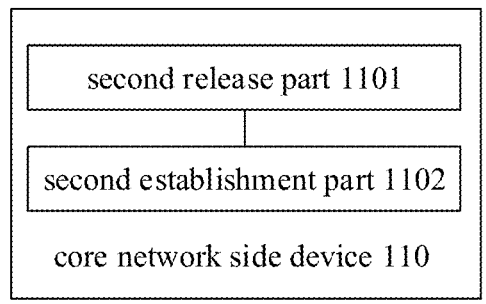
FIG. 11 illustrates a block diagram of a core network side device according to the embodiments of the disclosure.

Based on an inventive concept as same as the previous embodiments of the disclosure, a core network side device 110 is provided by the embodiment of the disclosure as illustrated in FIG. 11. The core network side device 110 includes a second release part 1101 and a second establishment part 1102.

The second release part 1101 is configured to, after receiving an handover indication from a UE, or after determining, based on a preset judgment strategy, that a handover of core network elements for the UE is needed, indicate that a source core network element needs to release a first context and a first connection configuration, for the UE, between the source network element and a serving base station of the UE.

The second establishment part 1102 is configured to indicate that the target core network element, after sending a handover command to the base station, needs to establish a second context and a second connection, for the UE, between the target core network element and the base station.

In the above solution, a network element at the core network side includes a source core network element and a target core network element. Accordingly, when the source core network element is an EPC network element, the target core network element is a 5GC network element, the first connection configuration includes a control plane configuration and a user plane configuration of an S1 interface related to the UE, and the second connection includes a connection of an N2 interface and a connection of an N3 interface related to the UE. Or, when the source core network element is a 5GC network element, the target core network element is an EPC network element, the first connection configuration includes a connection configuration of the N2 interface and a connection configuration of the N3 interface related to the UE, and the second connection includes a control plane connection and a user plane connection of the S1 interface related to the UE.

In the above solution, the handover indication is carried in a NAS signaling sent by the UE, and indicates to the source core network element that a handover of the types of the core network elements is needed.

In the above solution, the second release part 1101 is specifically configured to determine whether the handover of the core network elements for a UE terminal is needed based on at least one of: a load condition, subscription information of a user, or a defined triggering reason.

In addition, the embodiment of the disclosure provides a computer storage medium which stores a handover program. The handover program, when executed by at least one processor, implements the steps of the method in the third embodiment. For detailed description of the computer storage medium, the fifth embodiment of the disclosure may be referred to, which will not be repeated here.

Figure 12:
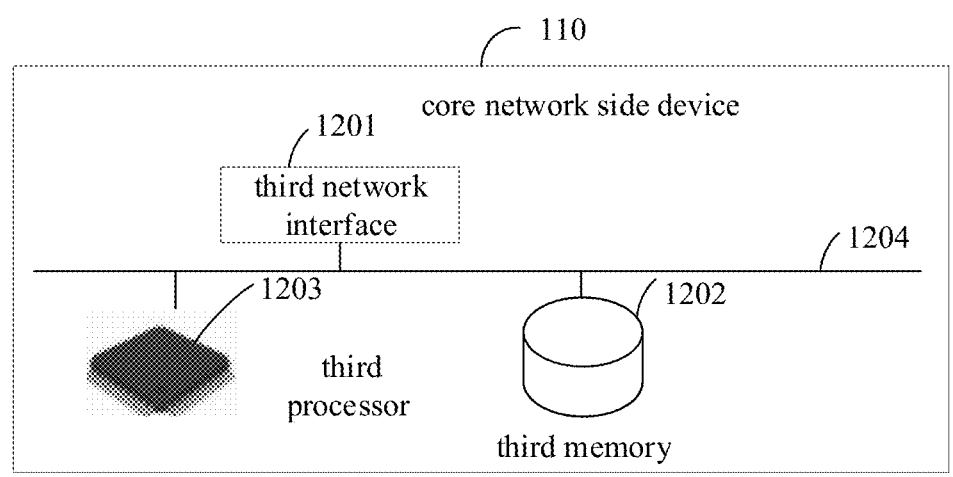
FIG. 12 illustrates a schematic diagram of the hardware structure of the core network side device according to the embodiments of the disclosure.

Based on the above core network side device 110 and the computer storage medium, a specific hardware structure of a core network side device 110 is provided by the embodiment of the disclosure, as illustrated in FIG. 12. The core network side device 110 includes a third network interface 1201, a third memory 1202 and a third processor 1203. all the components are coupled together by a bus system 1204. It can be understood that the bus system 1204 is configured to implement connection and communication between the components. Besides a data bus, the bus system 1204 further includes a power bus, a control bus, and a state signal bus. However, all buses are designated as the bus system 1204 in FIG. 10 for the purpose of clear illustration. The third network interface 1201 is configured to receive and send signals during information transceiving with one or more other external network elements.

The third memory 1202 is configured to store a computer program executable by the third processor 1203.

The third processor 1203 is configured to, when running the computer program, execute the following actions.

A source core network element releases, after receiving an handover indication from a UE, or after determining, based on a preset judgment strategy, that a handover of core network elements for the UE is needed, a first context and a first connection configuration, for the UE, between the source network element and a serving base station of the UE A target core network element establishes, after sending a handover command to the base station, a second context and a second connection, for the UE, between the target core network element and the base station.

It can be understood that components of a hardware structure of the core network side device 110 are similar to the corresponding parts in the fifth embodiment of the disclosure and an excessive description is omitted here.

Specifically speaking, the third processor 1003 in the core network side device 110 may further be configured to, when running the computer program, execute the steps of the method in the third embodiment of the disclosure, which will not be repeated here.

Those skilled in the art should understand that the embodiments of the present disclosure may be provided as methods, systems, or computer program products. Therefore, the present disclosure may take the form of hardware embodiments, software embodiments, or embodiments combining software and hardware aspects. Moreover, the present disclosure may take the form of computer program products implemented on one or more computer-usable storage media (including, but not limited to, magnetic disk memory, optical memory, etc.) containing computer-usable program code.

The present disclosure is described with reference to flowcharts and/or block diagrams of methods, devices (systems), and computer program products according to embodiments of the present disclosure. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, special-purpose computer, embedded processor, or other programmable data processing device to produce a machine, so that the instructions generated by the processor of the computer or other programmable data processing device are used to generate instructions for implementing the functions specified in one or more flowcharts and/or one or more blocks of the block diagrams.

These computer program instructions may also be stored in a computer-readable memory capable of directing a computer or other programmable data processing device to work in a particular manner such that the instructions stored in the computer-readable memory produce a manufactured article including an instruction device, the instruction device implements the functions specified in one or more flowcharts and/or one or more blocks of the block diagram.

These computer program instructions can also be loaded on a computer or other programmable data processing device, so that the steps can be performed on the computer or other programmable device to produce a computer-implemented process, and the instructions provide steps for implementing the functions specified in one or more flowcharts and/or one or more blocks of the block diagrams.

The above description is only the preferred embodiments of the present disclosure, and is not intended to limit the protection scope of the present disclosure.

In the embodiments of the embodiments of the disclosure, because a base station can access both an LTE core network and a 5G core network, the base station can support a terminal's establishment of connection with a LTE core network EPC on one hand and with an NR network 5GC on the other hand. Therefore, during a handover, a serving cell which the base station provides for a UE is not changed, while at the base station side, a connection between the base station and the core network elements is released and re-established, thus eliminating the need to disconnect and re-establish the physical-layer wireless link between the UE and the base station. Therefore, handover can be performed only between the core networks, and the handover performance is optimized.

The invention claimed is:

1. A handover method, executed by a user equipment (UE), the method comprising:
    sending a handover indication to a source core network element via a non-access stratum (NAS), when determining, based on a service to be supported, that a handover of core network elements is needed; and
    configuring a new radio bearer between the UE and a current serving base station;
    wherein the method further comprises at least one of the following:
    re-establishing a radio link control (RLC)layer between the UE and the base station based on a first strategy of the current serving base station; or
    restarting a media access control (MAC) layer between the UE and the base station based on a second strategy of the current serving base station;
    wherein the first strategy is: comparing configuration information of the RLC layer needed by the new radio bearer with configuration information of the RLC layer needed by a previous radio bearer; responsive to that the configuration information of the RLC layer needed by the new radio bearer is consistent with the configuration information of the RLC layer needed by the previous radio bearer, determining that re-establishment of the RLC layer is not needed; responsive to that the configuration information of the RLC layer needed by the new radio bearer is inconsistent with the configuration information of the RLC layer needed by the previous radio bearer, determining that the re-establishment of the RLC layer is needed;

wherein the second strategy is: comparing configuration information of the MAC layer needed by the new radio hearer with configuration information of the MAC layer needed by a previous radio bearer; responsive to that the configuration information of the MAC layer needed by the new radio bearer is consistent with the configuration information of the MAC layer needed by the previous radio bearer, determining that restart of the MAC layer is not needed; responsive to that the configuration information of the MAC layer needed by the new radio bearer is inconsistent with the configuration information of the MAC layer needed by the previous radio bearer, determining that restart of the MAC layer is needed.

2. The method according to claim 1, wherein configuring the new radio bearer between the UE and the current serving base station comprises:
reconfiguring a signaling radio bearer (SRB) and a data radio bearer (DRB) between the UE and the current serving base station.

3. The method according to claim 2, wherein reconfiguring the SRB and the DRB between the UE and the serving base station comprises:
reconfiguring a new packet data convergence protocol (PDCP) version and a new security key.

4. The method according to claim 1, wherein determining, based on the service to be supported, that the handover of core network elements is needed comprising:
determining a type of a core network needed by the service to be supported, and performing the handover of the core network elements, when the needed type of the core network is inconsistent with a type of a currently connected core network;
or,
determining, based on acquired information of external influence, whether the handover of the core network elements is needed.

5. A user equipment (UE), comprising a second processor and a second network interface, wherein,
the second processor is configured to determine, based on a service to be supported, whether a handover of core network elements is needed;
the second network interface is configured to send a handover indication to a source core network element via a non-access stratum (NAS), when the second processor determines, based on the service to be supported, that a handover of the core network elements is needed to be performed; and
the second processor is configured to configure a new radio bearer between the UE and a current serving base station;
wherein the second processor is further configured to perform at least one of the following:

re-establishing a radio link control (RLC)layer between the UE and the base station based on a first strategy of the current serving base station; or
restarting a media access control (MAC) layer between the UE and the base station based on a second strategy of the current serving base station;

wherein the first strategy is: comparing configuration information of the RLC layer needed by the new radio bearer with configuration information of the RLC layer needed by a previous radio bearer; responsive to that the configuration information of the RLC layer needed by the new radio bearer is consistent with the configuration information of the RLC layer needed by the previous radio bearer, determining that re-establishment of the RLC layer is not needed; responsive to that the configuration information of the RLC layer needed by the new radio bearer is inconsistent with the configuration information of the RLC layer needed by the previous radio bearer, determining that the re-establishment of the RLC layer is needed;

wherein the second strategy is: comparing configuration information of the MAC layer needed by the new radio hearer with configuration information of the MAC layer needed by a previous radio bearer; responsive to that the configuration information of the MAC layer needed by the new radio bearer is consistent with the configuration information of the MAC layer needed by the previous radio bearer, determining that restart of the MAC layer is not needed; responsive to that the configuration information of the MAC layer needed by the new radio bearer is inconsistent with the configuration information of the MAC layer needed by the previous radio bearer, determining that restart of the MAC layer is needed.

6. The UE according to claim 5, wherein the second processor is configured to:
reconfigure a signaling radio bearer (SRB) and a data radio bearer (DRB) between the UE and the current serving base station.

7. The UE according to claim 6, wherein the second processor is configured to:
configure a new packet data convergence protocol (PDCP) version and a new security key.

8. The UE according to claim 5, wherein the second processor is configured to:
determine a type of a core network needed by the service to be supported, and perform the handover of the core network elements, when the needed type of the core network is inconsistent with a type of a currently connected core network.

9. The UE according to claim 5, wherein the second processor is configured to:
determine, based on acquired information of external influence, whether the handover of the core network elements is needed.

* * * * *